(12) United States Patent
Mathew et al.

(10) Patent No.: US 6,702,369 B2
(45) Date of Patent: Mar. 9, 2004

(54) ROOF AND RACK ASSEMBLY

(75) Inventors: Boney A. Mathew, Clarkston, MI (US); Carl S. Howarth, Bloomfield Hills, MI (US)

(73) Assignee: Mathson Industries, Troy, MI (US)

(*) Notice: Subject to any disclaimer, the term of this patent is extended or adjusted under 35 U.S.C. 154(b) by 0 days.

(21) Appl. No.: 10/194,694

(22) Filed: Jul. 12, 2002

(65) Prior Publication Data

US 2003/0214156 A1 Nov. 20, 2003

Related U.S. Application Data

(60) Provisional application No. 60/378,084, filed on May 14, 2002, and provisional application No. 60/382,813, filed on May 23, 2002.

(51) Int. Cl.$^7$ .............................................. B62D 25/06
(52) U.S. Cl. ...................... 296/210; 296/37.7; 224/309; 224/322
(58) Field of Search ............................... 224/309, 322; 296/37.7, 210

(56) References Cited

U.S. PATENT DOCUMENTS

| | | | |
|---|---|---|---|
| 4,099,658 A | * 7/1978 | Bott | 296/37.7 |
| 4,239,138 A | 12/1980 | Kowalski | 224/321 |
| 4,277,009 A | * 7/1981 | Bott | 224/309 |
| 4,723,696 A | 2/1988 | Stichweh et al. | 224/331 |
| 5,004,139 A | * 4/1991 | Storm et al. | 224/309 |
| 5,016,798 A | 5/1991 | Stapleton et al. | 224/326 |
| 5,273,195 A | 12/1993 | Cucheran | 224/316 |
| 5,456,512 A | 10/1995 | Gibbs et al. | 296/37.7 |
| 5,535,930 A | * 7/1996 | Lee | 224/309 |
| 5,762,247 A | 6/1998 | Cucheran et al. | 224/321 |
| 5,975,391 A | 11/1999 | Aftanas et al. | 224/309 |
| 2002/0053581 A1 | * 5/2002 | Peschmann et al. | 224/319 |

* cited by examiner

Primary Examiner—Stephen T. Gordon
Assistant Examiner—Lori L Coletta
(74) Attorney, Agent, or Firm—Howard & Howard

(57) ABSTRACT

A roof and rack assembly (10) for an automotive vehicle includes a roof panel (12) received from polymeric organic material that has a top surface (14) and edges (16), (18) extending between a first or front (20) and a second or rear (22) ends of the roof panel (12). The roof panel (12) includes retaining elements (30) that are integrally formed and extend upwardly from the top surface (14) of the roof panel (12). The roof and rack assembly (10) further includes a track (24) for receiving a roof rack (26) and slidably adjusting the position of the roof rack (26) along the track (24), and a mounting member (28) for securing the track (24) to the retaining elements (30). The roof and rack assembly (10) provides an effective and a quick way of fastening the roof rack (26) to the roof panel (12) and is efficient, not time consuming and easy way to install the roof rack (26).

12 Claims, 4 Drawing Sheets

ROOF AND RACK ASSEMBLY

This application claims benefit of Provisional Appl. No. 60/378,084 filed May 14, 2002 and Provisional Appl. No. 60/382,813 filed May 23, 2002.

BACKGROUND OF THE INVENTION

1. Field of the Invention

The subject invention relates to a motor vehicle roof rack, and more particularly to an assembly for fastening of a roof rack on the motor vehicle body.

2. Description of the Prior Art

Numerous motor vehicle roof rack fastening arrangements and vehicle article carriers are known in the prior art and are widely used in the automotive industry. U.S. Pat. No. 4,723,696 to Stichweh et al., U.S. Pat. No. 4,239,138 to Kowalski, U.S. Pat. No. 5,975,391 to Aftanas et al., and U.S. Pat. No. 5,456,512 to Gibbs et al. disclose a variety of roof rack fastening arrangements for carrying roof racks and other elements of vehicle interior.

The '696 patent to Stichweh et al. discloses a roof rack fastening arrangement for motor vehicles that comprises a roof gutter, which forms a covered drip molding and plates that support feet of the roof rack wherein the plates are secured at specific positions. The plates include supporting flanges which are raised on one longitudinal side and on which a supporting feet of the roof rack. The roof rack fastening arrangement further includes a Z-shaped clamping fitting for support of the rack that can be tensioned by way of fastening screws.

The '138 patent to Kowalski discloses a slotted side rail and a cross-rail that receives bracket for association with a carrier member. The slidable cross-rail is supported between a pair of cross-rail receiving brackets and is movable with the brackets. Each bracket of the cross rail includes a disc for locking the bracket. The disc prevents loosening of the bracket and movement of the bracket along the side rail.

The '391 patent to Aftanas et al. discloses a mounting apparatus wherein the apparatus is adapted to be disposed within a channel formed in an outer body surface of a vehicle. The channel includes a hook portion to securing a slat to the hook without the use of conventional fasteners and holes, drilled in the outer body surface of the vehicle. The apparatus comprises a mounting bracket having a base portion and a pair of offset arm portions. The arm portions include threaded openings that allow conventional fastening elements to be used to secure the slat to the mounting bracket.

The '512 patent to Gibbs et al. discloses a rack is described that has an adjustable securing mechanism for securing cross slats between side rails. The securing mechanism includes a plunger wherein a coil spring pushes the plunger in a position in which it can co-act with an aperture in a side rail.

An era of modern technology introduced several ways to provide an efficient and economic method for installing and making plastic parts used in automotive industry such as plastic roofs, doors, headliners, etc. One of the areas of continuous development and research is the area of installation and assembly of these parts to a body of a vehicle that is efficient, easy to use and does not require much time and skill. Therefore, there is a need in the automotive art for a new, easy to use and install, roof and rack assembly.

BRIEF SUMMARY OF INVENTION

A roof and rack assembly for an automotive vehicle comprising a roof panel of polymeric organic material having a top surface and edges extending between first and second ends of the roof panel. The roof panel includes retaining elements that are integrally formed and extending upwardly from the top surface of the roof panel. The roof and rack assembly is characterized by a track for receiving a roof rack member and slidably adjusting the position of the roof rack member along the track, and a mounting member for securing the track to the retaining elements.

The present invention provides several advantages over the prior art patents including an effective and a quick way of fastening a roof rack to a roof panel.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Referring to the Figures, wherein like numerals indicate like or corresponding parts throughout the several views, a roof and rack assembly for automotive vehicle is generally shown at 10.

Figure 1:
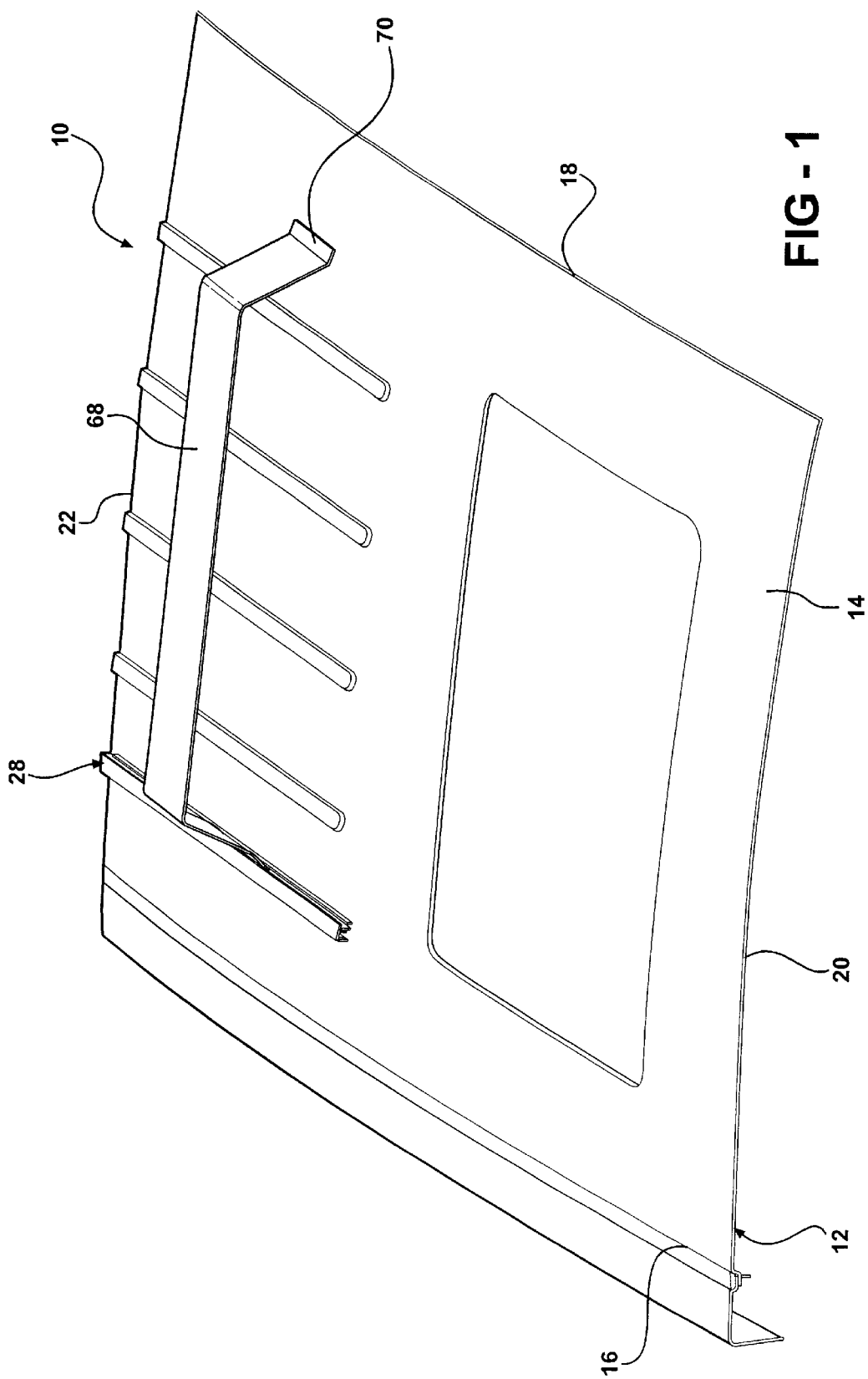
FIG. 1 is a perspective view of the roof and rack assembly.
Figure 2:
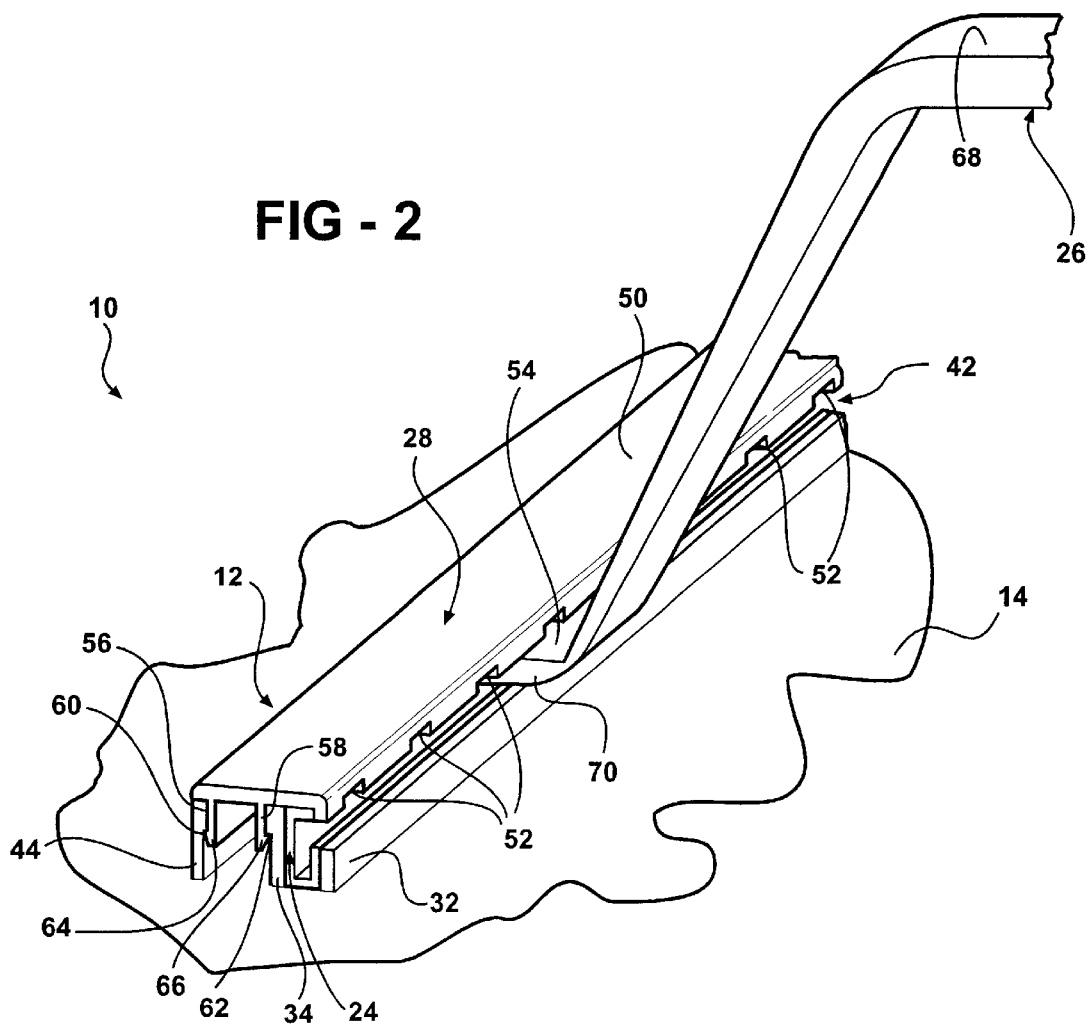
FIG. 2 is a perspective partial view of the roof and rack assembly.
Figure 5:
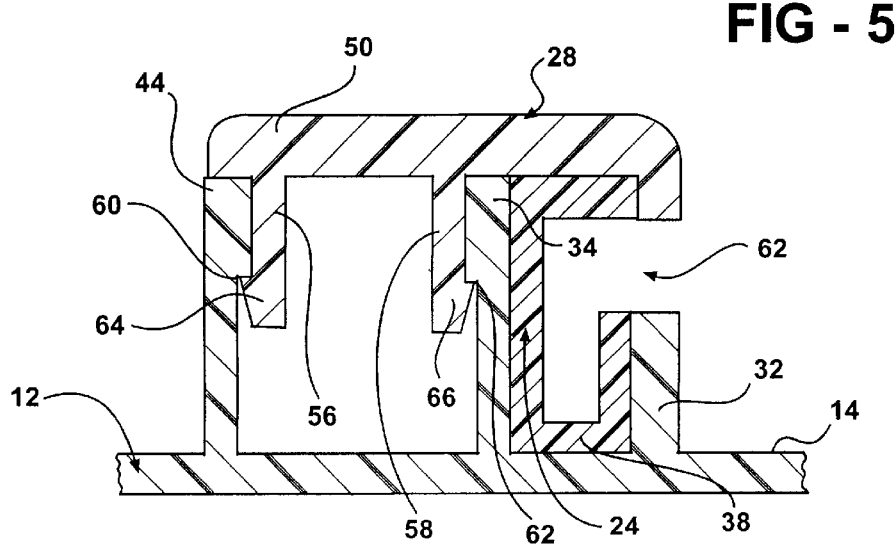
FIG. 5 is a cross-sectional view through retaining elements, a mounting member, and a track of FIG. 4.
Figure 3:
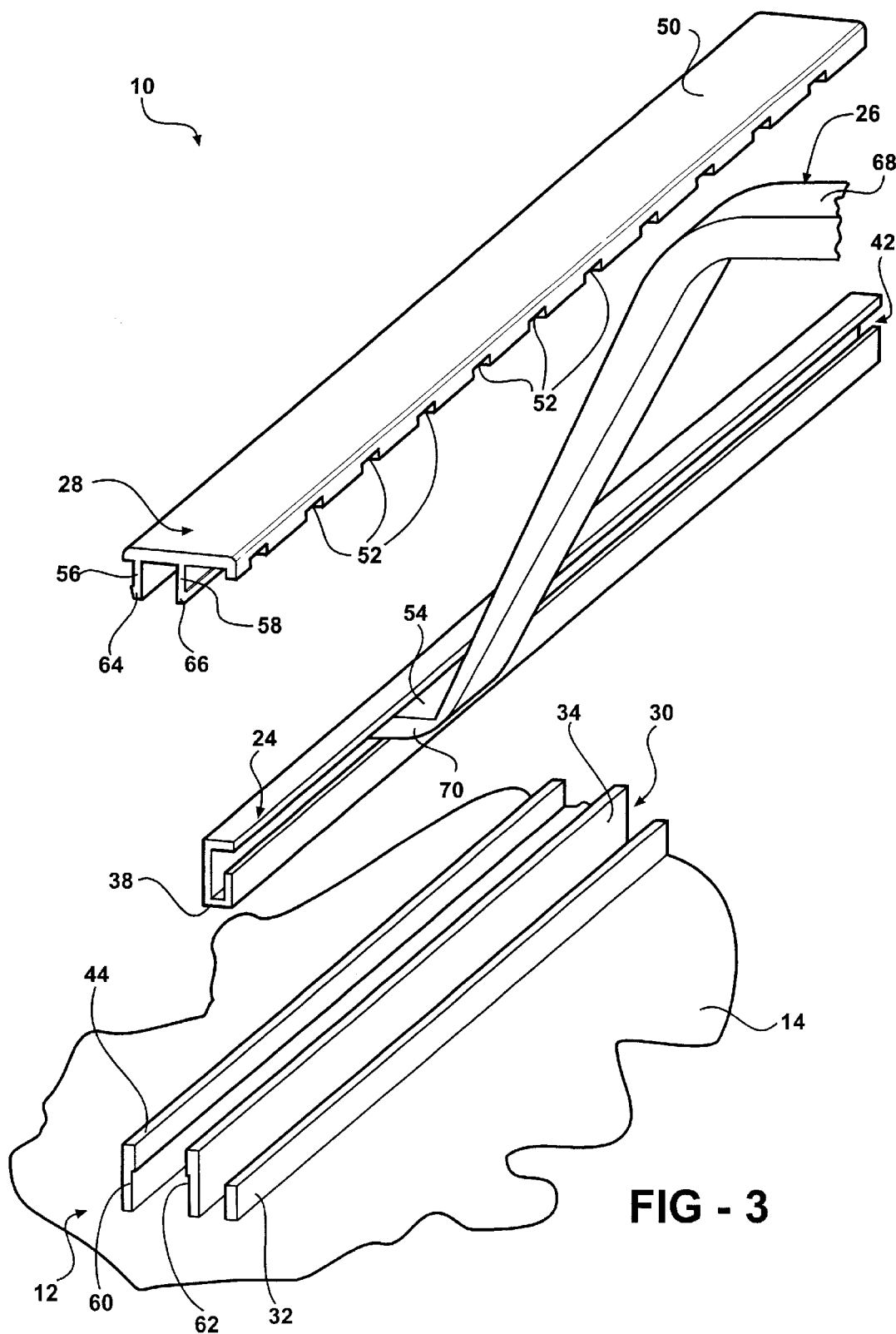
FIG. 3 is a perspective assembly view of the roof and rack assembly.
Figure 4:
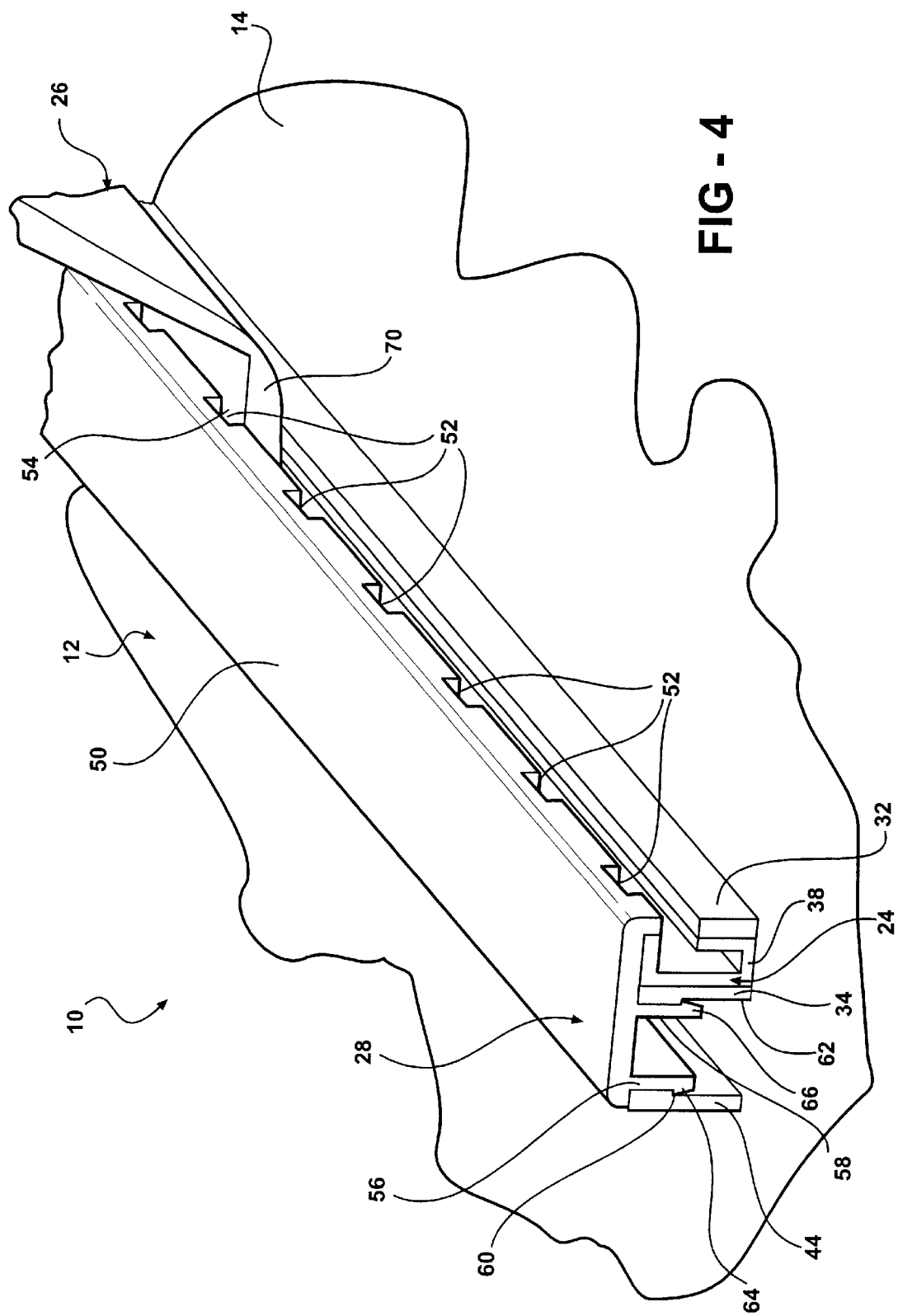
FIG. 4 is another perspective partial view of the roof and rack assembly.

The roof and rack assembly 10 for an automotive vehicle comprises a roof panel, generally indicated at 12, made of polymeric organic material. The roof panel 12 has a top surface 14 with edges 16 and 18 extending between first or front 20 and second or rear 22 ends of the roof panel 12. The roof panel 12 includes a plurality of retaining elements, generally shown at 30 in FIG. 3, that are integrally formed with the roof panel 12 and extend upwardly from the top surface 14 of the roof panel 12.

The roof and rack assembly 10 is characterized by the combination of a track, generally indicated at 24, for receiving a roof rack 26, generally indicated at 26, and slidably adjusting the position of the roof rack 26 along the track 24, and a mounting member, generally indicated at 28, for securing the track 24 to the retaining elements 30.

The retaining elements 30 include a first 32 and a second 34 spaced ribs or walls that extend along and adjacent opposite edges 16 and 18 of the roof panel 12. The retaining elements 30 further include a third rib or wall 44 spaced from and parallel to the second rib 34. The first rib 32 has a height from the roof panel 12 that is less than the height of the second rib 34 and the third rib 44. The second 34 and third 44 ribs also include female grooves 60 and 62, extending longitudinally along the second 34 and third 44 ribs in the interior walls thereof.

The track 24 has a generally C-shaped cross-section with a bottom 38 extending between sides wherein one of the sides has a slot, generally shown at 42, therealong for receiving the roof rack 26. The slot 42 in the track 24 extends along the first rib 32. The sides of the track 24 are disposed between and engage the first 32 and the second 34 ribs whereby the track 24 is nestled between the first 32 and the second 34 ribs. The track 24 is formed from organic polymeric material, including lubricated materials with desirable tribological properties. The track 24 has a simple profile, which provides a lubricated, smooth surface for the roof rack 26 to slide against.

The mounting member 28, also formed from organic polymeric material, includes structure that enables the mounting member 28 to engage the roof rack 26 and prevent the same from sliding movement along the track 24. The mounting member 28 comprises a cap 50 extending over the third 44 and the second 34 ribs and over the track 24. The cap 50 includes notches 52 spaced therealong to establish locked positions of the roof rack 26 along the track 24. The roof rack 26 includes raised portions 54 for co-acting with the notches 52. Alternatively, the raised portions 54 may be separate elements with a spring member that biases the raised portions 54 or elements 54 to be pushed upwardly and downwardly into engagement with the notches 52 to allow the roof rack 26 to be moved along the track 24. Furthermore, the mounting member 28 includes a pair of parallel legs 56 and 58 extending downwardly from the cap 50 between and adjacent the second 34 and third 44 ribs. The mounting member 28 retains the track 24 nestled between the first 32 and the second 34 ribs.

The roof and rack assembly 10 includes a mechanical snap-together elements disposed on the retaining elements 30 and the mounting member 28 for snapping the mounting member 28 into retaining engagement with the retaining elements 30. The snap-together elements are disposed on the second 34 and third 44 ribs and the legs 56 and 58. The snap-together elements comprise female grooves 60 and 62, extending longitudinally along the second 34 and third 44 ribs respectively, and male ramps 64 and 66 extending longitudinally along the legs 56 and 58. The male ramps 64 and 66 snap into the female grooves 60 and 62.

Finally, the roof rack 26 has a raised center section 68 and feet 70 at either end thereof extending downwardly and into the slot 42 of the track 24 along each edge 16, 18 of the roof panel 12.

In order to assemble the components, the track 24 is inserted into a channel between the first 32 and second 34 ribs. Next, the foot 70 of the roof rack 26 is positioned into the track 24 through the slot 42 of the track 24. When the roof rack 26 is engaged in the track 24 the roof and rack assembly 10 receives the mounting member 28 to secure the track 24 and the roof rack 26 in place. In that position the legs 56 and 58 are inserted between the second 34 and third 44 ribs. The male ramps 64 and 66, extending longitudinally along the legs 56 and 58, are snapped respectively into the female grooves 60 and 62 extending longitudinally along the second 34 and the third 44 ribs to secure the mounting member 28 within the retaining elements 30. At the same time, the notches 52 of the cap 50 are positioned over the raised portions 54 of the roof rack 26 and receive the raised portions 54 therein respectively to secure the roof rack 26 within the channel and to prevent the roof rack 26 from sliding therewith.

The mounting member 28 provides a snap lock onto parallel second 34 and third 44 ribs, locking the entire roof and rack assembly 10 together. An overhang position of the mounting member 28 provides a positive anchoring of the track 24. In addition, the mounting member 28 provides an esthetically attractive surface appearance, including molded in color and a Class A surface appearance.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A roof and rack assembly (10) for an automotive vehicle comprising;
   a roof panel (12) of polymeric organic material and having a top surface (14) with edges (16), (18) extending between first (20) and second (22) ends,
   retaining elements (30) integrally formed with said roof panel (12) and extending upwardly from said top surface (14),
   a track (24) for receiving a roof rack member (26) and slidably adjusting the position of the roof rack member (26) along said track (24), and a mounting member (28) for securing said track (24) to said retaining elements (30),
   a mechanical snap-together element disposed on said retaining elements (30) and said mounting member (28) for snapping said mounting member (28) into retaining engagement with said retaining elements (30).

2. A roof and rack assembly (10) for an automotive vehicle comprising;
   a roof panel (12) of polymeric organic material and having a top surface (14) with edges (16), (18) extending between first (20) and second (22) ends,
   retaining elements (30) integrally formed with said roof panel (12) and extending upwardly from said top surface (14),
   a track (24) for receiving a roof rack member (26) and slidably adjusting the position of the roof rack member (26) along said track (24), and a mounting member (28) for securing said track (24) to said retaining elements (30), said mounting member (28) includes structure to engage the roof rack member (26) for preventing sliding movement of the roof rack member (26) along said track (24).

3. A roof and truck assembly (10) as set forth in claim 1 wherein said track (24) and said mounting member (28) comprise organic polymeric material.

4. A roof and truck assembly (10) as set forth in claim 1 wherein said retaining elements (30) include first (32) and second (34) spaced ribs extending along and adjacent opposite said edges (16), (18) of said roof panel (12) and said track (24) has a generally C-shaped cross-section with a bottom (38) extending sides with one of said sides having a slot (42) therealong for receiving the roof rack (26) and said slides disposed between and engaging said first (32) and second (34) ribs.

5. A roof and truck assembly (10) as set forth in claim 4 wherein said retaining elements (30) further include a third rib (44) spaced from and parallel to said second rib (34), said snap-together elements disposed on said second (34) and third (44) ribs.

6. A roof and truck assembly (10) as set forth in claim 5 wherein said first rib (32) has a height from said roof panel

(12) that is less than the height of said second rib (34) and said slot (42) in said track (24) extends along and above said first rib (32).

7. A roof and truck assembly (10) as set forth in claim 6 wherein said mounting member (28) comprises a cap (50) extending over said third (44) and second (34) ribs and over said track (24) to retain said track (24) nestled between said first (32) and second (34) ribs.

8. A roof and truck assembly (10) as set forth in claim 7 wherein said cap (50) of said mounting member (28) includes notches (52) spaced therealong for establishing locked positions of said roof rack (26) along said track (24).

9. A roof and truck assembly (10) as set forth in claim 8 including said roof rack (26) having raised portions (54) for co-acting with said notches (52).

10. A roof and truck assembly (10) as set forth in claim 9 wherein said mounting member (28) includes a pair of parallel legs (56), (58) extending downwardly from said cap (50) between and adjacent said second (34) and third (44) ribs, said snap-together elements being disposed on said legs (56), (58) and said second (34) and third (44) ribs.

11. A roof and truck assembly (10) as set forth in claim 10 wherein said roof rack (26) has a raised center section (68) and feet (70) at either end thereof extending downwardly and into said slot (42) of said track along each edge (16), (18) of said roof panel (12).

12. A roof and truck assembly (10) as set forth in claim 10 wherein said snap-together elements include female grooves (60), (62) extending longitudinally along said second (34) and third (44) ribs and male ramps (64), (66) extending longitudinally along said legs (56), (58) for snapping into said female grooves (60), (62).

* * * * *